Oct. 22, 1929.                  D. PATTERSON                  1,732,377
                            PIANO TEACHING MECHANISM
                             Filed Feb. 16, 1926          7 Sheets-Sheet 1
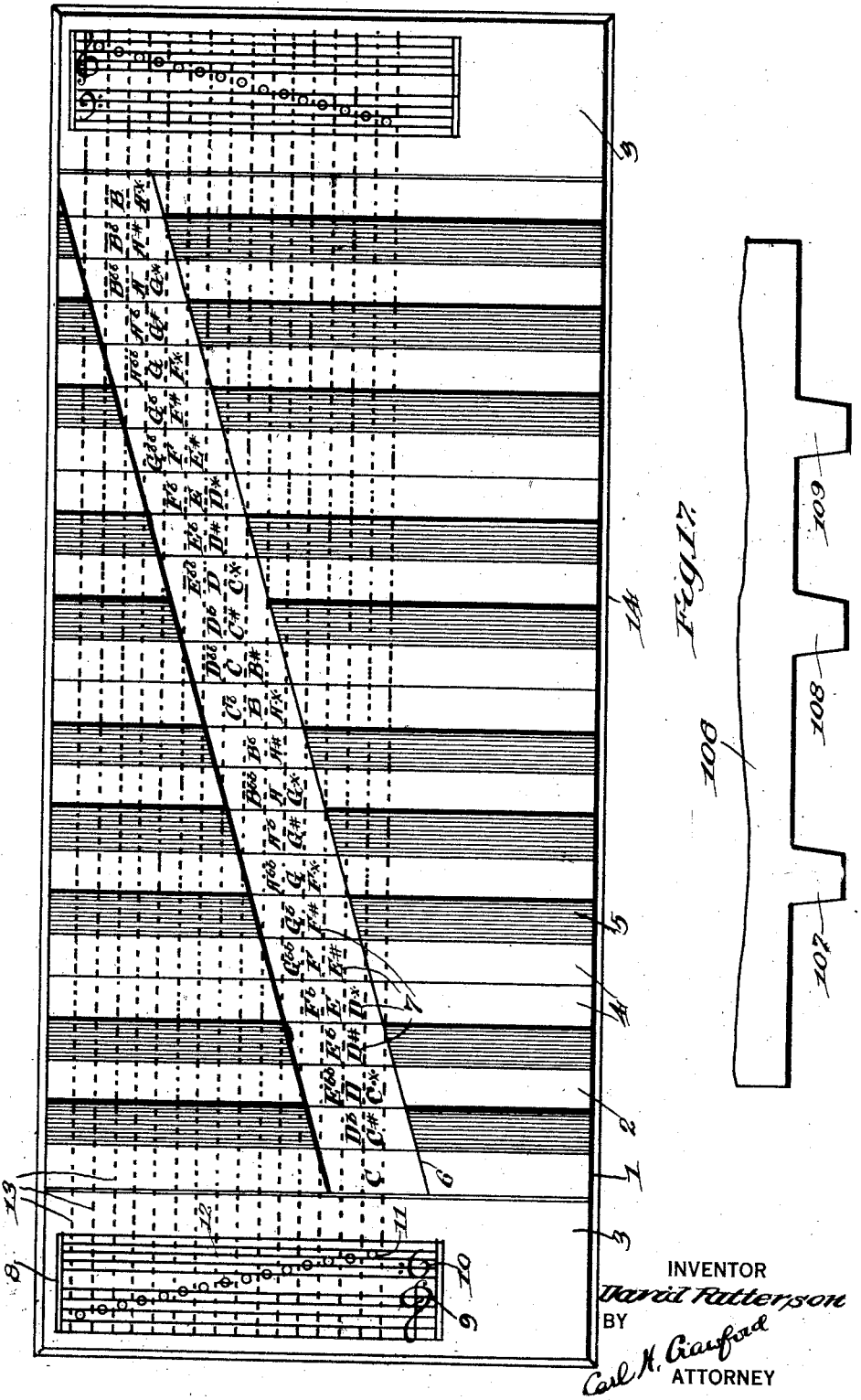
INVENTOR
David Patterson
BY
Carl M. Crawford
ATTORNEY Oct. 22, 1929.                D. PATTERSON                1,732,377
                          PIANO TEACHING MECHANISM
                     Filed Feb. 16, 1926        7 Sheets-Sheet 2
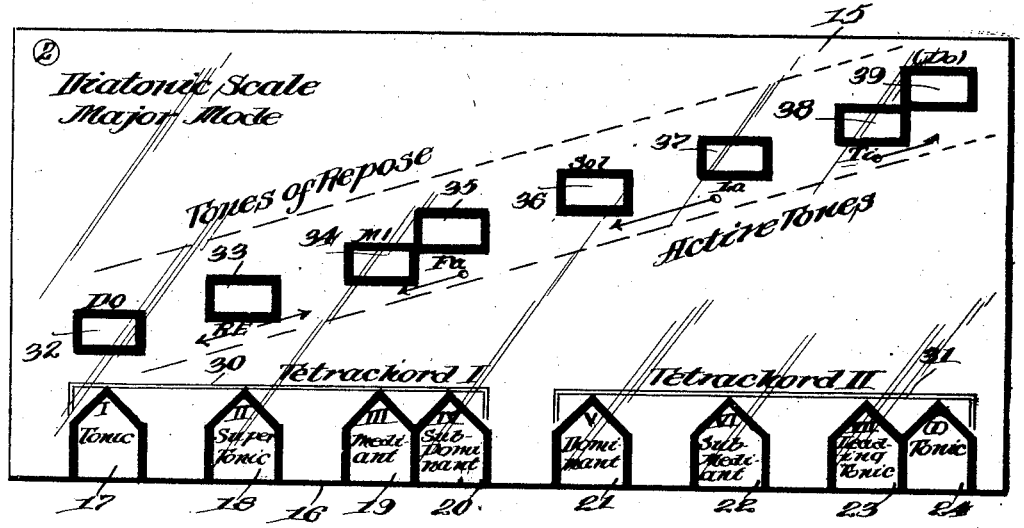
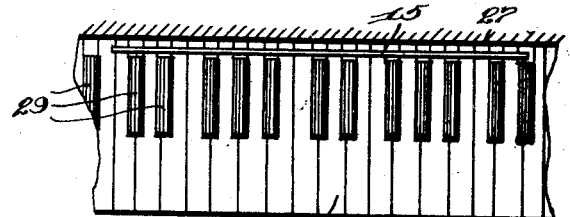
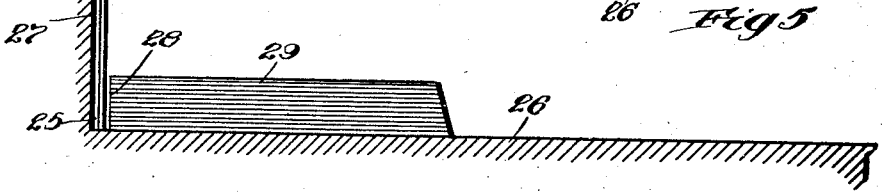
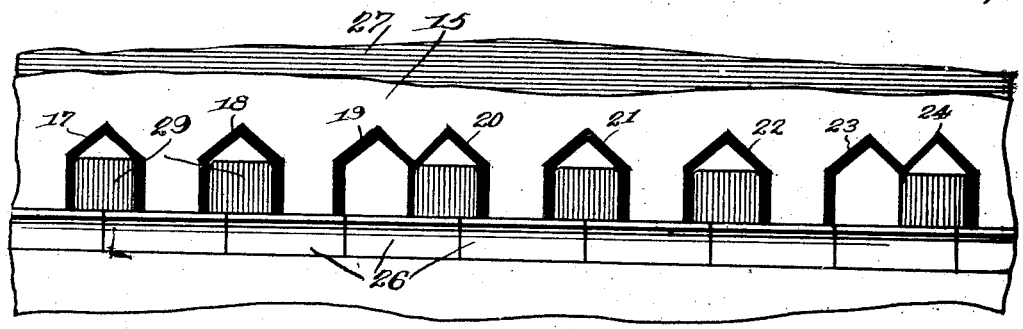
INVENTOR
David Patterson
BY
Carl H. Crawford
ATTORNEY Oct. 22, 1929.  D. PATTERSON  1,732,377
PIANO TEACHING MECHANISM
Filed Feb. 16, 1926   7 Sheets-Sheet 3
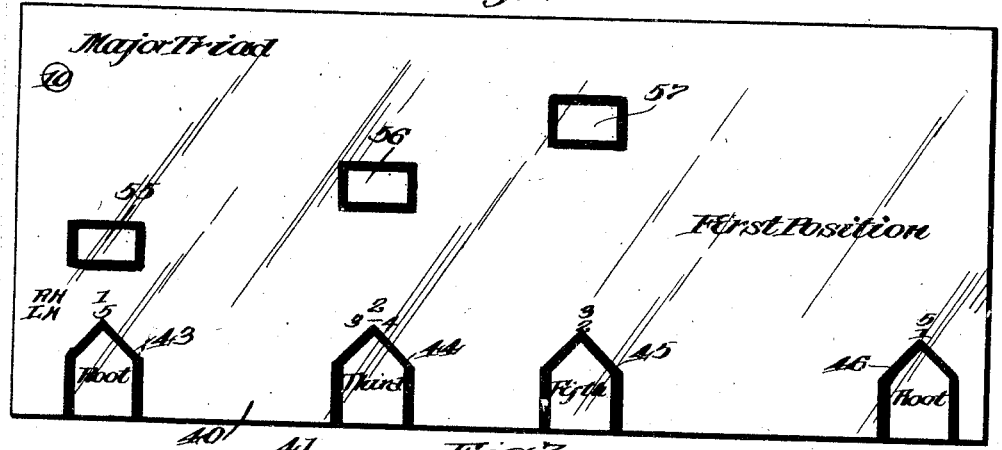
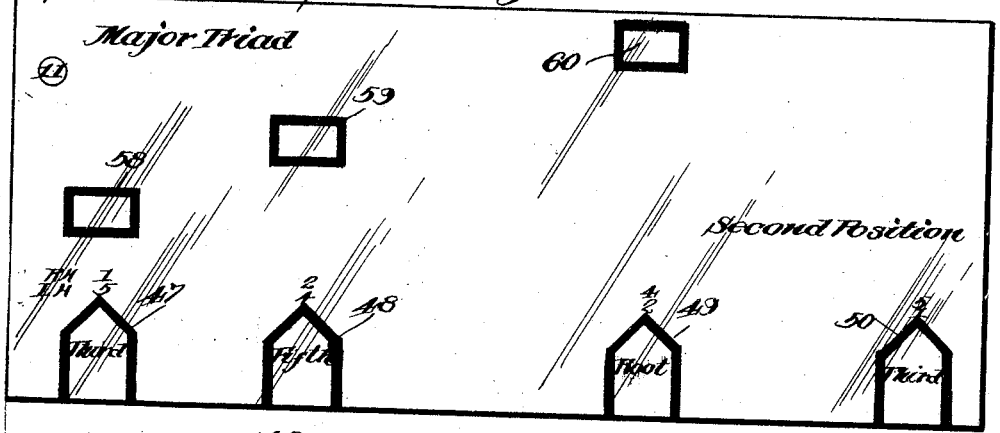
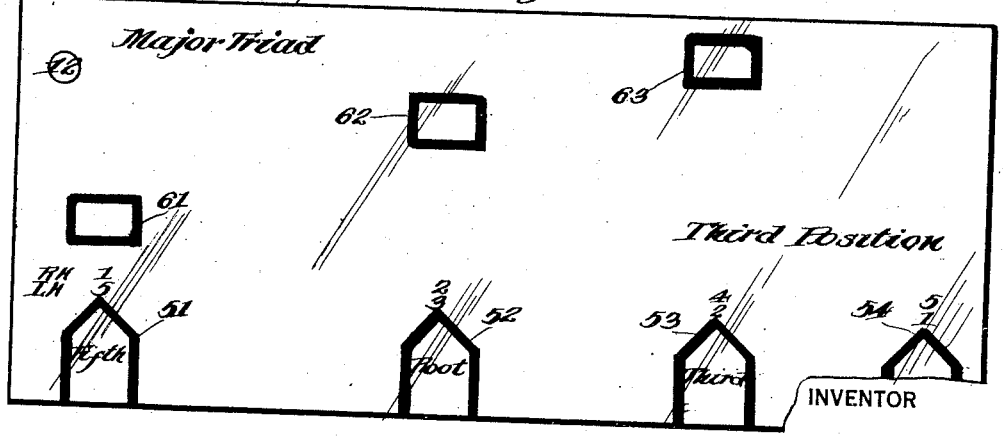
INVENTOR
BY D. Patterson
Carl H Crawford
ATTORNEY Oct. 22, 1929.　　　D. PATTERSON　　　1,732,377
PIANO TEACHING MECHANISM
Filed Feb. 16, 1926　　　7 Sheets-Sheet 4
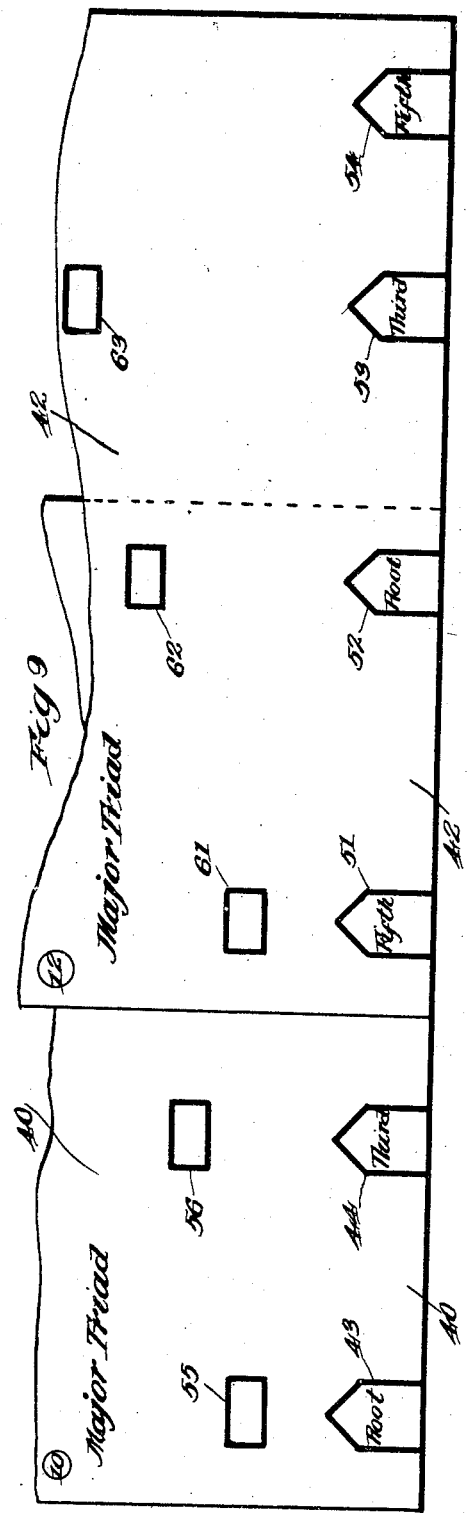
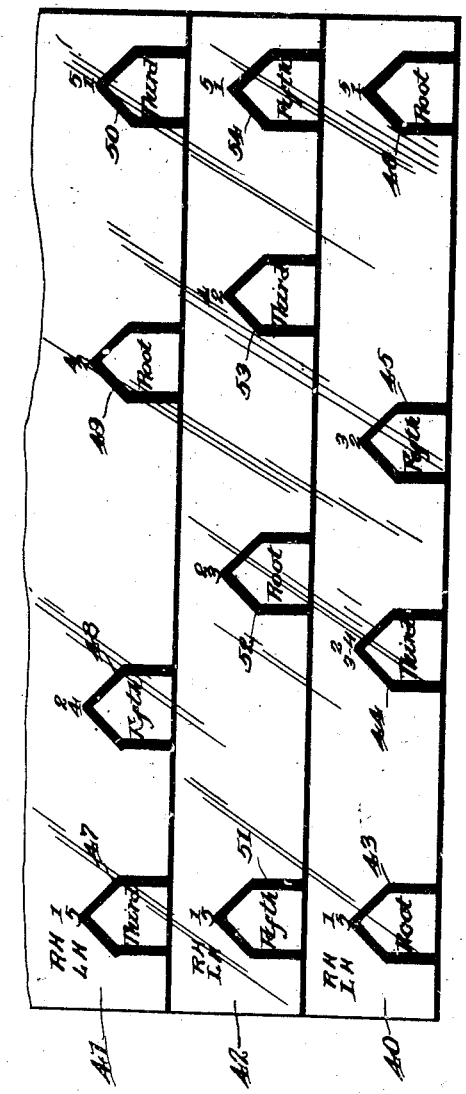
INVENTOR
David Patterson
BY
Carl H. Crawford
ATTORNEY Oct. 22, 1929.         D. PATTERSON         1,732,377
PIANO TEACHING MECHANISM
Filed Feb. 16, 1926        7 Sheets-Sheet 5
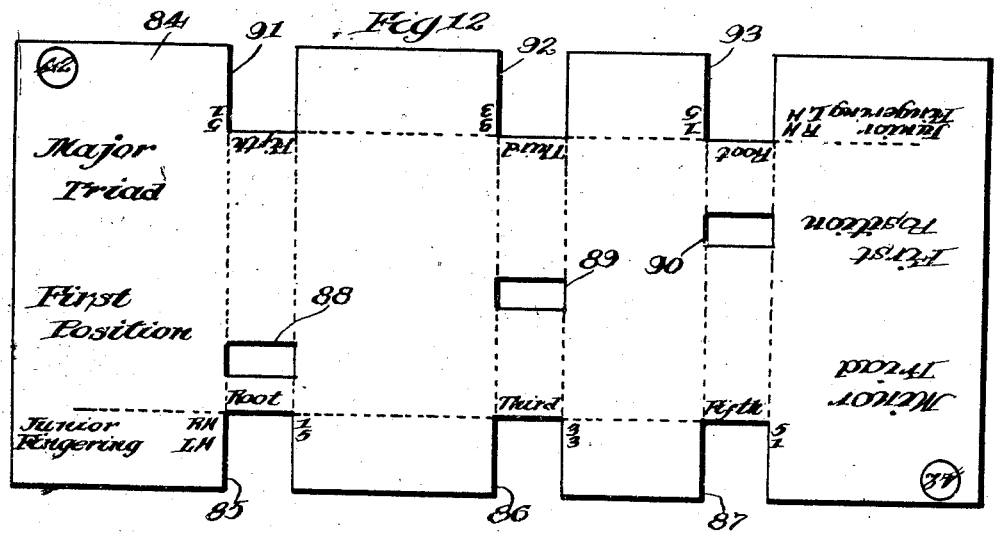
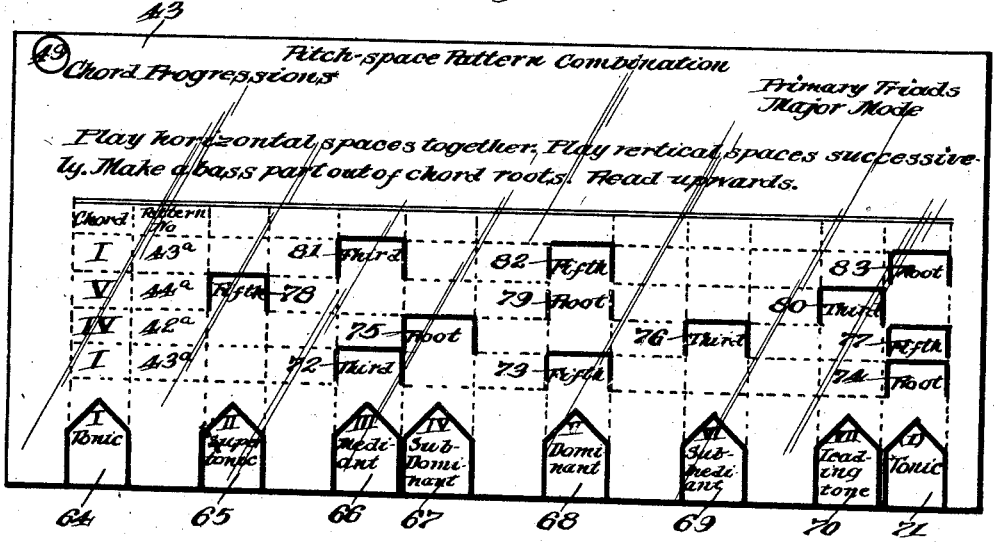
INVENTOR
David Patterson
BY
Carl H. Crawford
ATTORNEY Oct. 22, 1929.  D. PATTERSON  1,732,377
PIANO TEACHING MECHANISM
Filed Feb. 16, 1926    7 Sheets-Sheet 6
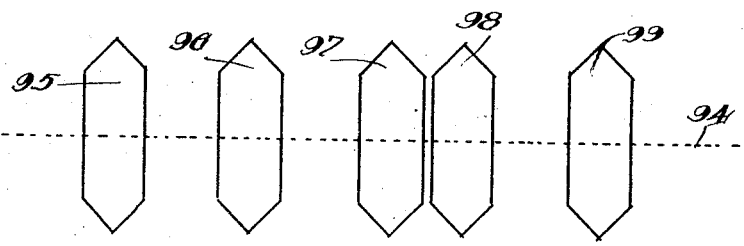
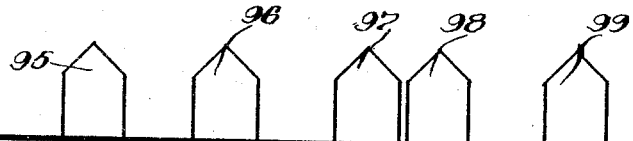
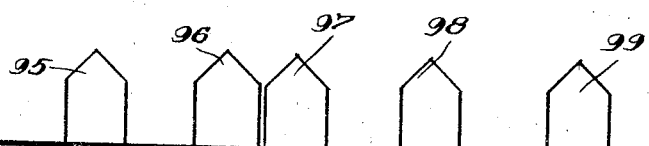
INVENTOR
David Patterson
BY
Carl H. Crawford
ATTORNEY

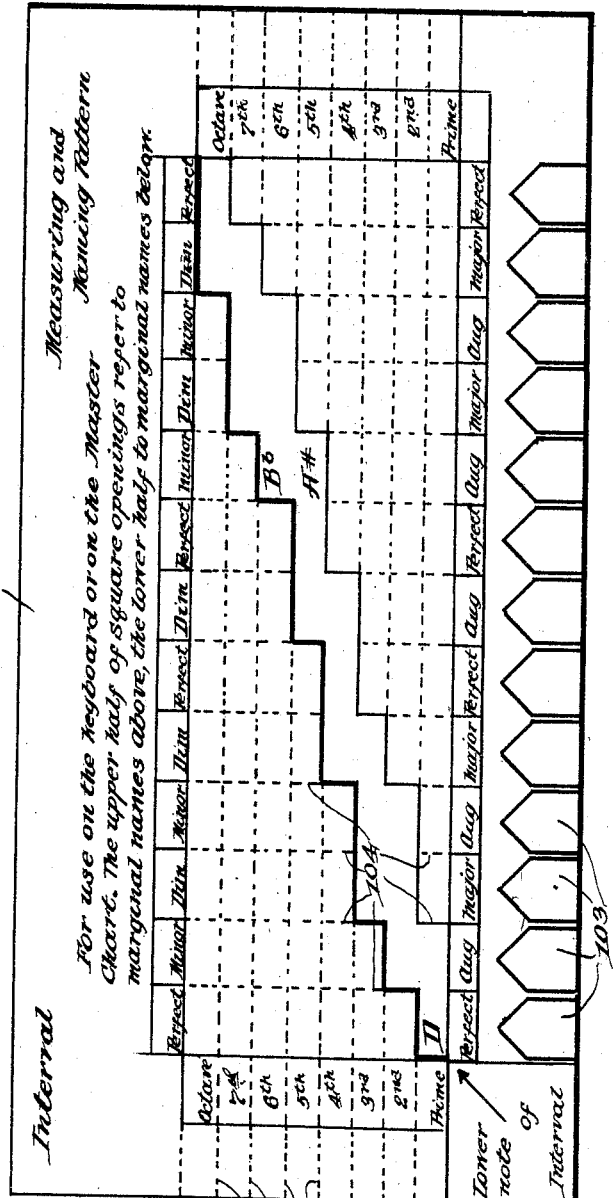

Patented Oct. 22, 1929

1,732,377

UNITED STATES PATENT OFFICE

DAVID PATTERSON, OF SPOKANE, WASHINGTON

PIANO-TEACHING MECHANISM

Application filed February 16, 1926. Serial No. 88,606.

The object of this invention is to provide a novel method and means for teaching music on or for the piano.

One of the primary objects of the invention is to enable the student to acquire a working knowledge of music and piano technic in less time than has been heretofore possible, and the invention employs as its inspiration, although not as its subject matter, some now very conclusively developed and proven psychological principles that have taken a controlling position in pedagogy. Accordingly, I first teach the thing itself, and then, the substance of the thing, just as in elementary schools, the primary pupil learns objects and actions and their nature, prior to learning how to spell the names of such objects and actions, or even the letters that make up such names.

Thus it is one of the objects of the invention to teach the pupil the keyboard "shape" and sound of a musical entity, whether that entity happens to be a chord, a scale, an interval, etc., or any variation thereof, and in this connection, it is a special feature of the invention to teach the shape or conformation of these various entities one at a time in any and all transposable positions on the keyboard so that the shape and sound of a given entity will be as clearly fixed in the student's mind in one key as in another.

In this, which I might roughly term, an elementary step in the development of the pupil, it is the object to co-ordinately and conjointly to develop the sense of sight, hearing, and what psychologists term the tactile and kinæsthetic sense, which latter roughly constitutes the sense of touch, and the sense of muscular effort, respectively, so that all these senses will be localized and concentrated on the acquisition of the fullest realization of the keyboard and hand shapes of a given entity in all positions on the keyboard, and hence, in this phase of the invention, the teaching constitutes a training of a sensory-motor or explicit character.

After the pupil has acquired a sensory-motor training enabling him to execute the various entities (by perception, and in a sense habitually), then he is required to supplement his knowledge of entity shapes and his acquired skill, by acquiring the ability to "spell" the key shapes of the entities in the letters and their modifying exponents of sharps and flats etc., which I will hereinafter collectively term "note indicia"; this phase of my invention also involving any and all transpositions of the entities.

It is a further feature of the invention to visualize to the student the notative position of the entity being studied, on the regulation staffs, preferably in such a manner that simultaneously with the "spelling" by indicia, the student will have before him the exact position on the staffs of the notes constituting the particular entity, and further, he will have simultaneously indicated the key location in any transposition; these steps or phases being considered novel individually and in various combinations and constituting what may be termed a training of a mental or implicit character.

My invention has other objects and features which will be more fuly described in connection with the accompanying drawings and which will be more particularly pointed out in and by the appended claims.

In the drawings:—

Fig. 1, is a face view of my improved master chart.

Fig. 2, is a face view of one of my improved pattern cards formed of transparent material.

Fig. 3, is a front elevation of a portion of the key board of a piano showing how my improved card visually registers the keys to be played to produce the entity legended on said card.

Fig. 4, is a vertical sectional view thereof illustrating the relation of the card to the rear ends of the black keys.

Fig. 5, is a plan view of a portion of the keyboard with the card thereon.

Figs. 6, 7 and 8, show three cards of the major triad in different positions, these cards being of transparent material.

Fig. 9, illustrates one manner of combining said cards.

Fig. 10, illustrates another manner of combining said cards.

Fig. 11, illustrates a composite card in which a number of musical entities is combined, the card being of transparent material.

Fig. 12, is an invertible card of opaque material having key integers in the form of notches and note integers in the form of openings.

Figs. 13, 14 and 15, illustrate a foldable combination card of suitable opaque material and which is duplex to indicate the entity in major mode, in one position, and in minor mode, in another position.

Fig. 16, is a face view of my improved interval measuring and naming card, which is formed of opaque material.

Fig. 17, is a form of card in which the key integers are in the form of projections whereby pressure on the card will sound the entity on the piano.

Like characters of reference designate similar parts throughout the different figures of the drawings.

I will first, in detail, describe the structure of my invention as shown in the drawings, and I will then describe the operation thereof.

I will first refer to the master chart and to the elements represented thereon, reference being had to Fig. 1.

This chart may consist of a flat sheet of paper or other suitable material, the operative face 1 of which is divided into key and staff sections 2 and 3, respectively, the staff sections being identical. The key section 2, bears the representation in developed plan, of twenty-four keys of the piano keyboard, the white keys being designated at 4, and the black keys at 5, the black keys being shown, in this instance, as being co-extensive in length with the white keys. A note spelling column 6, diagonally intersects the key representations 4 and 5 and extends completely across section 2, as shown. In order to retain the outline of the keys, within said column, I have continued the lateral key lines therethrough, as shown.

Superimposed upon each key representation, in that portion thereof within the column 6, are all of the individual note designating letters and the modifying exponents thereof, which I will broadly term "note indicia," as indicated generally at 7. Where any one key has a plurality of indicia, as for instance, the second white key from the left of section 2, which bears "C double sharp, D, E♭♭", I dispose such indicia in super-posed, vertical columnar order but within the outlines of column 6, and in a manner so that they may be vertically segregated, as will later appear. For convenience and in the interests of readability, I have only employed the "sharp and flat" modifying exponents, not the "natural".

In section 3, I have shown a fac-simile of a musical staff 8, with treble and bass clefs 9 and 10, respectively, thereon. The staff 8 is shown bearing notes 11, all being designated as whole notes, comprising one octave above and one octave below middle C. I have shown note locating lines 13 laterally enclosing the notes and extending laterally across the keys and in intersecting relation to the note spelling column. This column 6, is disposed in such oblique angular relation to the keys 4 and 5, that said lines 13, will enclose or parallel or segregate corresponding note designating letters, and the exponents thereof, on corresponding keys, the keys being of a uniform width equal to that of the rear portion of an actual piano key and parallel with the staff. For convenience, I have duplicated the staff section at each end of the key section to facilitate the spelling operation.

It will now be clear that the note indicia extends at different elevations from the base or lower margin 14, of the chart, and that those portions of the keys 4 and 5, between the column 6 and the margin 14, are clear and unobstructed for a functional performance in co-acting relation to the column 6, as will presently appear.

I will next refer to my improved pattern cards, first describing their structure and thereafter detailing the manner in which they are used. I may state that while I consider it a feature of my invention to provide pattern cards of an opaque material with suitably disposed openings or windows, I consider it a feature of my invention to provide cards of transparent material, those portions which would otherwise be openings, being graphically outlined or bordered for disclosure therethrough of segregated chart or key matter.

I desire here briefly to state that it is a feature of my invention to teach the playing of musical entities at one time on the piano keyboard and each in all of the different keys, which I will first describe in detail in connection with Figs. 2, 3 and 4.

In Fig. 2, I have shown a transparent pattern card 15 bearing the legend "Diatonic scale, major mode". This card has a continuously straight lower margin 16, and suitably outlined in predetermined order adjacent said margin, is a plurality of fixed key designating integers indicated at 17 to 24, inclusive. These integers constitute relatively heavily outlined spaces proportioned to visually register with the piano keys, either white or black or any combination of both. In this instance, the integers are arranged and disposed to indicatively register with the keys that must be played to produce the "diatonic scale in the major mode."

I dispose the card 15, abreast of the keys in a manner to effect indicative registry with the black as well as the white keys and in actual practice, I prefer to dispose the card 15 in the space back of the black keys as indicated at 25, the lower edge 16 resting on the face of all the keys 26 and 29 and between the fall board 27, of the piano, and the rear elevated ends 28, of the black keys 29. This disposition is such that the card 15, will not only be held in an upright or upstanding position, but it is a disposition such that the card will register with that portion, which is the rear portion of the white keys and which are identical in width with the black keys, as will be clearly seen by reference to Fig. 5. It is by reason of these facts, that I am able to make the integers 17 to 24, not only of uniform width and of fixed distance spacing, but also in fixed relation with the card. It will now be clear that because of this construction of the card, and its novel disposition on the keyboard, I am able freely to adjust the card 15 longitudinally of the keyboard for transposing the musical entity, which in this instance is the "diatonic scale in the major mode" to various pitch positions on the keyboard so that the same entity can be played in any key, or in other words, so that the keys at any pitch, for playing said entity, will be accurately indicated. In the instance shown, integers 17 and 18, indicate black keys, 19 indicates a white key, 20, 21, and 22 indicate black keys, 23 indicates a white key and 24 a black key. It will be clear that the integers register with the keys to be played in such a manner as to clearly indicate the same, visually, and in the total absence of notative or other musical indication.

Thus, the student is taught, objectively, and through the sense of touch, the sense of sight, the sense of hearing, all of which are co-related, the exact keyboard, hand, and sound shape of the musical entity. I therefore energize the central nervous system so that in a sensory motor way, the student is objectively taught the elements of the musical entity.

Within the outlined integers, I have denoted different degrees of the scale by such terms as "tonic," "super-tonic", etc., and I have also denoted by roman numerals, within the integers, the equivalent of the words therein. These, however, relate to harmonic instruction with which the elementary student is not at first concerned. I have also bracketed off, at 30, the first four integers 17 to 20, and legended the same "Tetrachord I", the last four integers being bracketed off at 31, and legended "Tetrachord II", which is for analytical practice.

I will next refer to that portion of the card 15 which pertains to notation and hence to the subjective or implicit phase of instruction, and which is used in combination with the master chart.

I have provided the card with means which I will call note integers and which in this card consists of relatively heavily outlined spaces indicated at 32 to 39, inclusive. Although not essential to this particular phase of the invention (in the absence of integers 17 to 24), I have shown the note integers in a predetermined relation to the key integers which is a feature in combination with the latter when both are used on the master chart. Therefore, describing the note integers as they are herein shown, it will be seen that they are in individual vertical or superposed alinement with their corresponding key integers, for instance, integer 32, being directly above 17, and so on. Further, and this is a special feature, it will be seen that the note integers 32 to 39, are disposed at such successive elevations or so spaced that they are positioned relative to the staff position of the individual notes comprising the musical entity of which the card is a pattern and will register with the diagonally disposed indicia on the keys of the master chart, this disposition being such that this registration and disclosure, simultaneously through all the note integers, will be possible with the lower margin 16 of the card 15, in parallel relation with the lower margin of the master chart, or in other words, with the lower margin of card 15 in rectangular relation to the keys on the master chart.

After the student has familiarized himself with the piano keys, and has learned habitually to play the entities, the pattern card is transferred from the piano keyboard to the rack on which the master chart is disposed. Thus I direct the student's eyes away from the piano keyboard and by shifting the pattern card on the rack to different positions relative to the lower unlettered portion of the key representations 4 and 5 of the master chart, I cause the student to play corresponding keys on the piano while looking at the keys of the master chart.

This preliminary practice may be carried out in combination with only the integer spaces or openings and the key representations 4 and 5, just as though the master chart was not equipped with the spelling column, or any letter indicia at all; thus the respective spaces would show only black or white in various sequences depending upon the entity the card in use defines.

Assuming that the student is prepared to begin the subjective or implicit study of the notative significance of a "diatonic scale in the major mode", the card 15 will be superimposed upon the master chart and when in a given position, the letter indicia of the keys of the master chart will be visible through integers 32 to 39, showing the student the "spelling" of the aforesaid scale, the integers 32 to 39 each being of a height only sufficient to disclose one letter and its modifying exponent on each key. By keeping the card 15, with its lower margin parallel with the lower margin of the chart, the student will always have the card 15 in the correct position to visually disclose the correct combination of key indicia. After the student has learned to "spell" the aforesaid scale on card 15, then, he may learn the same by note. The note locating lines 13, will enable the student to trace the key indicia onto the staff, to learn the staff location of the notes indicated by the key indicia, and because this card 15, is transparent, this operation will be greatly facilitated. By shifting card 15, longitudinally along the master chart, the student is enabled to spell out the scale when the latter is transposed to different keys or pitch, and thereby learn the scale by letter, in any transposition. As the card is shifted or adjusted to transpose the scale on the key indicia, the corresponding position will be indicated on the staff.

I will next show how the student can not only obtain the "spelling" of the scale in any transposition and also the corresponding staff position of the notes, but wherein he may also have indicated the key shape of the scale simultaneously with both of the foregoing.

The keys 4 and 5, of the master chart 1, are purposely elongated toward the reader from the spelling column so that in any position of the card 15 on the chart 1, whether in a high or low staff position, the keys 4 and 5 will extend far enough so that they will register with the key integers 17 to 24. Thus, the student, in any transposition of the scale will have the piano key position visualized. Now it will be noted that where there is more than one letter constituting the key indicia, these letters are disposed in vertical columnar form longitudinally of the keys 4 and 5. Hence, the student will know that he has the card 15 in a correct position when the integers 17 to 24 are in registry with the keys 4 and 5, this being an additional function for the integers 17 to 24, aside from their main function.

I will next refer to Figs. 6, 7 and 8, which illustrate pattern cards 40, 41 and 42. These cards show the major triad in the first, second and third positions, in "octave fingering", this term being employed because these cards each involve an octave, in the production of the musical entity set forth thereby. These cards each have key integers which are indicated, with respect to the various cards, as 43 to 46, on card 40; 47 to 50 as regards card 41; and 51 to 54, as regards card 42. These integers function the same as the integers hereinbefore described in connection with card 15, and hence, the description of the same need not be repeated. It will also be seen that these cards have note integers 55 to 63, which are the same in function and structure as the note integers on card 15. Adjacent the key integers, harmonic terms are written out such as "root", "third", and "fifth", and the numbers adjacent said integers are used to designate the fingers to be employed in playing the keys.

A major triad, is one of the fundamental necessities in the development of piano technic, and in these three forms shown, keeping in mind the various different transpositions that the same are capable of, on either the piano keyboard or the master chart, I have in this one specimen, as it were, shown how every form of this triad can be played. In other words, I have shown how all its possible variations can be exhausted. It will be clear, without specific illustration, from all the foregoing, that the possibilities of a seventh chord could be exhausted in four positions. Along scale tone lines, all possible variations of a quintrad could be exhausted in seven positions. I use the term "quintrad" to mean any group of five tones along the scale line.

I will next refer to Fig. 9, wherein I have shown cards 40 and 42, in elongated overlapping relation with their upper and lower edges in alinement, the cards being held in this position by paper clips of any kind, for this temporary use. This shows how these cards can be combined to elaborate the chord, or in other words, elongate the same, along the key board. These cards are not indiscriminately united, but they are united in various ways so that a harmonic entity will result.

In Fig. 10, I have shown how cards 40, 41, and 42, can be overlapped in vertical order, to give chord progressions. In other words, with this Fig. 10 arrangement set up on the keyboard, the student would play first the keys indicated by the lowest card, and then successively by the upper cards, arranged always, in harmonic form.

In Fig. 11, I have shown what I will term a composite card 43, which shows key integers 64 to 71 that indicate the piano keys to be played to produce the major scale, as is the case in card 15, of Fig. 2. Above the integers 64 to 71, I have shown supplemental key integers in horizontal alinement, the first group being indicated by 72 to 74, the next by 75 to 77, the next by 78 to 80 and the top group by 81 to 83. The playing of any one or more of these groups involves the major scale, although in this form, I have not shown octave fingering. This card, however, in one single embodiment, affords a wide range of study in one of the simplest forms of chord progressions.

In Fig. 12, I have shown a single card 84, which is a combination invertible card and is preferably shown as being opaque. In the disposition shown, this card has notches, 85 to 87, which are adapted to physically register with black keys or visually register with white keys, the notches or key integers being disposed for "junior fingering," this term distinguishing from "octave fingering" by reason of the fact that the octave does not occur in this form. The card has openings forming note integers 88 to 90, disposed for use on the master chart. On the opposite margin, when the card is inverted, the edge has key integer notches 91 to 93. While Fig. 12 discloses key integer notches, this is for completeness of disclosure, as it is evident that the character of key integers previously described may be used if desired. In the position shown, the card indicates how the first position of the major triad is played while in the inverted position, it will indicate the keys for playing the minor triad. It will be understood that this entity can be transposed, as in the case of all other cards. Also it should be evident that this form of card can be utilized in every instance in which the entity on one edge constitutes a pure reversal of that on the other edge regardless as to whether it is or not the same entity in different modes, thus a dominant seventh in fourth position on one edge becomes on the other edge a secondary or collateral seventh in second position.

Reference will next be made to Figs. 13 to 15, inclusive. In this form, I have shown an opaque sheet of paper or other easily foldable material and have indicated by line 94, where the same is to be folded, as shown in Figs. 14 and 15. I have shown key designating integers 95 to 99, which I will term duplex integers because one half extends from one side of the line of fold 94, and the other, from the other side thereof. Thus, the card will have two working faces, one being indicated at 100, and the other at 101. The integers have been arranged and disposed to indicate the keys, when in the Fig. 14 position, to play the "quintrad" in the major mode. When the same card is turned about, as shown in Fig. 15, it will indicate the keys to be played to produce the "quintrad" in the minor mode.

In Fig. 16, I have shown an "interval measuring and naming card" 102. This card has piano key integers 103, one for each key of the octave. The card is divided off with vertical lines 104 and horizontal lines 105, into vertical and horizontal columns. The horizontal columns are divided off as "octave," "7th," "6th," "5th," "4th," "3rd," "2nd," and "prime," one division of this character being at each end of the card. Extending diagonally from the lower left hand to the upper right hand corner, is an open space which may comprise one or more squares of the aforesaid columns. If more than one indicia should show through, when the card is disposed on the master chart, then the upper columnar name would signify the spelling to be accepted, and if the letter showing was disposed in the lower portion of the cut-out, then, the lower name would be controlling.

I have shown indicia of the master chart in the spelling column thereof, as though this card 102 were superimposed on the master chart, which is one of the major functions of card 102.

Suppose the student placed the card 102 on the chart with the lower left extremity registering with the key of D, and he wanted to name the interval composed of the keys D and B flat, well, by following the horizontal lines, and observing the name in the top of the corresponding column, he would find that D and B flat would be a minor seventh. If he wanted to name the interval composed of D, and A sharp, he would find that this would be an augmented fifth. In actual practice, card 102 has two primary uses on the master chart, to wit:—naming intervals which occur in written music and spelling and writing intervals. Like all the other cards, this card 102 is movable to any position on the master chart, and functions to name or spell any musical interval within the octave.

In Fig. 17, I have shown a card 106 wherein the key integers 107 are in the form of projections 107, 108 and 109, which are extended from the lower edge 110, of the card so that when the card is pressed downwardly upon the keys of the piano, a certain entity will be sounded. This feature is adapted for incorporation with any of the cards heretofore shown. This feature is for the most elementary and young students, and for the blind. The only difference between this card and those heretofore shown, resides in the projection of the integers, otherwise, this card has all the advantages and all the capabilities of the other cards.

In my complete work, there are about sixty fundamental pattern cards, and adding the various combinations included herewith there would be about seventy not counting intervals, which alone would be an infinite veriety, or other variables and combinations. In multiplying by transposition, there would be approximately eight hundred key board hand shapes. However, I have shown enough of each main variety of fundamental cards to enable the rest to be understood, and worked out by any skilled musician without the exercise of invention.

It may now be stated that my primary object is to teach pitch relations, as the foundation on which all forms of music are based.

I claim:—

1. As a means of sensory-motor training in teaching piano playing, a series of pattern cards each designating a musical entity and each card having key designating integers for indicating the keys to be played to produce the entity designated on the card, the card being adjustable to different longitudinal positions on the key board for transposing and indicating the same entity at different pitch positions on the key board.

2. As a means of sensory-motor training in teaching piano playing, a series of pattern cards each designating on one side face thereof a musical entity and each card having on the same face a series of fixed key designating integers spaced to register with the keys to be played to produce the entity when the card is set upright back of the black keys, the card being adjustable to different positions longitudinally of the key board for transposing and indicating on the keys the same entity at different pitch positions on the key board on either white or black or any combination of both kinds of keys.

3. As a means of sensory-motor training in teaching piano playing, a series of pattern cards each designating on one side face thereof a musical entity and each card having on the lower margin of the same face a series of fixed key designating integers spaced and shaped to register in outline with the keys to be played to produce the entity when the card is set upright back of the black keys, thereby leaving the key board unobstructed for playing, the card being adjustable to different positions longitudinally of the key board for transposing and indicating by registry with the keys the same entity at different pitch positions on the key board and coacting with either white or black keys or any combination of both on which the entity may be played, whereby the fingers and ear of the student will be conjointly trained to play the keys of the entity irrespective of or in the absence of notative perception.

4. As a means of sensory-motor training in teaching piano playing, a series of pattern cards, and each card having key designating integers for indicating the keys to be played to produce the entity for which the card was intended, said card having indicia adjacent said integers for indicating the fingers to be used for the respective keys, the card being adjustable to different longitudinal positions on the key board for transposing and indicating the same entity at variously different positions on the key board.

5. As a means of sensory-motor training in teaching piano playing, a series of pattern cards, and each card having a set of key designating integers for indicating the keys to be played to produce the entity for which the card was intended, said card having note integers in alinement with said key integers and in predetermined relative elevation with respect to each other corresponding to the staff positions of the notes of the keys of the entity indicated.

6. As a means of sensory-motor training in teaching piano playing, a series of pattern cards, and each card having a set of key designating integers for indicating the keys to be played to produce the entity for which the card was intended, said card having note integers corresponding in number to said key integers and in individual vertical alinement therewith, said note integers being in relative elevations with respect to each other corresponding to the staff positions of the notes of the keys of the entity indicated.

7. As an article of manufacture for use in a piano teaching system as described, a master chart having a section bearing the representation of a complete portion of a piano key board in developed plan, with the black keys coextensive in length with the white keys, said chart having a section bearing a facsimile of musical staffs with the treble and bass clefs at one end of the key board section with the lines of the staffs parallel with the keys, said staffs bearing notes comprising one octave above and below middle C with the notes in lateral spaced relation, note locating lines enclosing the notes and extending therefrom in transverse intersecting relation across the keys of said key section, and a note spelling column diagonally intersecting the keys of said key section, the keys within said column each bearing singly or in superposed order all their individual note designating letters and modifying exponents thereof, said column being disposed at such an oblique angle to the keys that said note locating lines will enclose corresponding note designating letters on said keys.

8. As an article of manufacture for use in a piano teaching system as described, a master chart bearing the representation of keys of the piano and each key bearing all its note designating letters and their modifying exponents, a staff on said chart bearing notes corresponding to the letters on said keys, and note locating lines extending from the several notes on said staff to corresponding note designating letters on the proper keys.

9. In the described piano teaching mechanism, a means of visualizing key location and notation of one or more musical entities in different keys, the combination with the described master chart and pattern cards, the chart bearing the representation of keys of the piano in developed plan, and each key bearing all its individual note designating indicia, a staff on said chart bearing notes corresponding to the indicia on said keys, and note locating lines extending from the several notes on said staff to corresponding note indicia on corresponding keys, the pattern card being slidably and transposably adjustable in superimposed relation on said chart and having note integers for readably disclosing note indicia on said keys, and said card having key integers for visually indicating the keys on said chart corresponding to note indicia visible through said card, whereby staff notating definition and key location of the entity in any key may be simultaneously imparted to the student.

10. A pattern card of the class described formed of transparent material and having outlined portions thereon for registry and readability purposes, said outlined portions being relatively spaced and disposed adjacent one edge of said card to designate piano keys to be employed in producing a musical entity.

11. A pattern card of the class described having key integers projecting from one edge thereof, whereby depression of the card will engage the keys and sound the musical entity.

12. A pattern card of the class described having duplex key integers outlined on a central portion thereof, said card having a line of fold intersecting said integers, whereby when the card is doubled on said line of fold the integers of one operative face will indicate the keys for playing the entity in one mode while the integers on the remaining operative face will indicate the keys for playing the same entity in another mode.

13. An invertible pattern card of the class described provided on opposite edges thereof with notched key designating integers for the same entity in different modes, whereby the card can be inverted from one position to another to practice the same entity in different modes.

14. As a means of measuring and naming musical intervals, the combination with a master chart bearing the representation of piano keys and said keys bearing individual note designating indicia, and a measuring and naming card divided off into squares by intersecting columns having inter-related definitive names, said card having an elongated opening intersecting said columns whereby adjustment of said card with said opening abreast of said indicia will define the interval in a musical term.

15. A reversible pattern card of the nature disclosed having duplex key integers outlined thereon, said card having a line of fold intersecting said integers, whereby when the card is doubled on said line of fold the key integers of one operative face will indicate a predetermined key combination while the key integers on the remaining operative face will indicate a key combination of the same keys in reverse order.

16. An invertible pattern card of the nature disclosed provided on one edge with key integers indicating a predetermined key combination and on the opposite edge with key integers relatively aligned with those on said one edge and indicating a key combination of the same keys in reverse order.

17. An invertible pattern card as claimed in claim 16, which is provided with note integer openings intermediate its opposite edges each aligned with the key integers of both said edges.

In testimony that I claim the foregoing as my own, I hereby affix my signature.

DAVID PATTERSON.